United States Patent [19]

Norton et al.

[11] Patent Number: 5,568,275

[45] Date of Patent: Oct. 22, 1996

[54] METHOD FOR VISUALLY AND AUDIBLY REPRESENTING COMPUTER INSTRUCTIONS FOR EDITING

[75] Inventors: Mark J. Norton, Bedford; John J. Walsh, North Chelmsford, both of Mass.

[73] Assignee: Avid Technology, Inc., Tewksbury, Mass.

[21] Appl. No.: 494,761

[22] Filed: Jun. 26, 1995

Related U.S. Application Data

[63] Continuation of Ser. No. 45,978, Apr. 9, 1993, abandoned, which is a continuation of Ser. No. 867,125, Apr. 10, 1992, abandoned.

[51] Int. Cl.⁶ .............................. H04N 5/76; G11B 27/02
[52] U.S. Cl. ................ 386/52; 360/13; 386/54; 386/55
[58] Field of Search ........................ 358/311, 335, 358/342, 310, 341, 343; 360/14.1, 13, 32, 19.1

[56] References Cited

U.S. PATENT DOCUMENTS

| | | | |
|---|---|---|---|
| 4,729,044 | 3/1988 | Kiesel | 360/14.3 |
| 4,746,994 | 5/1988 | Ettlinger | 360/13 |
| 4,750,050 | 6/1988 | Belmares-Sarabia | 358/311 |
| 4,837,638 | 6/1989 | Fullwood | 360/14.2 |
| 4,920,423 | 4/1990 | Shiota | 358/335 |
| 4,956,725 | 9/1990 | Kozuki et al. | 362/14.3 |
| 4,972,274 | 11/1990 | Becker et al. | 360/14.1 |
| 5,012,334 | 4/1991 | Etra | 358/102 |
| 5,101,364 | 3/1992 | Davenport et al. | 395/152 |
| 5,126,851 | 6/1992 | Yoshimura et al. | 358/335 |
| 5,138,500 | 8/1992 | Haikawa et al. | 360/19.1 |

FOREIGN PATENT DOCUMENTS

| | | |
|---|---|---|
| 0113993 | 7/1984 | European Pat. Off. . |
| 0268270 | 5/1988 | European Pat. Off. . |
| 0403118 | 12/1990 | European Pat. Off. . |
| 438299 | 7/1991 | European Pat. Off. . |
| 0526064 | 2/1993 | European Pat. Off. . |
| 63-313382 | 12/1988 | Japan . |
| 63-313383 | 12/1988 | Japan . |
| 2235815 | 3/1991 | United Kingdom . |
| 9110321 | 7/1991 | WIPO . |

OTHER PUBLICATIONS

Peter Krieg, "Multimedia–Computer und die Zukunft des Film/Videoschnitts", Fernseh Und Kino Technik, vol. 45, No. 5, 1991, Heidelberg, Germany, XP229093, pp. 252–258.
Norton, Mark, "A Visual EDL System", 134th SMPTE Technical Conference, Toronto, Canada, Nov. 12, 1992.
Leanne Ryan, "Editing the Montage Way New 'Picture–Processing' Approach to Film and Video Editing Is Focus of 'User' Targeted Report," The Film and Videotape Production Magazine, Jun. 1984, pp. 164–165.

*Primary Examiner*—Thai Q. Tran
*Assistant Examiner*—Robert Chevalier
*Attorney, Agent, or Firm*—Wolf, Greenfield & Sacks, P.C.

[57] ABSTRACT

The invention is a method for visually and audibly representing computer instructions for editing video which provides audio and/or visual information with such instructions for editing a video tape or film program. Audiovisual information is provided by storing with the identification of the source of each segment audiovisual representations of that segment. Typically, the instructions are stored on a computer and the audiovisual representations are digitized sequences of video images and sound, whereby an operator can request playback of the representations for any source segment.

31 Claims, 4 Drawing Sheets

```
TITLE: VISUAL EDL
FCM: NON-DROP FRAME
FCM: DROP FRAME
001 055    A   C           06:03:18:27   06:03:23:27   01:00:00:00   01:00:05:00
FCM: NON-DROP FRAME
002 BL     V   C           00:00:00:00   00:00:00:00   01:00:00:00   01:00:00:00
FCM: DROP FRAME
002 055    V   D   015     06:46:56:25   06:46:57:25   01:00:00:00   01:00:01:00
003 055    V   C           06:46:25:03   06:46:26:03   01:00:01:00   01:00:02:00
004 055    V   C           06:41:55:00   06:41:55:15   01:00:02:00   01:00:02:15
M2  055        000.0       06:41:55:00
* FREEZE FRAME:
005 055    V   C           06:42:29:00   06:42:29:15   01:00:02:15   01:00:03:00
006 055    V   C           06:42:12:04   06:42:13:05   01:00:03:00   01:00:04:01
007 055    V   C           06:03:18:27   06:03:19:11   01:00:04:01   01:00:04:15
008 055    V   C           06:03:19:11   06:03:19:11   01:00:04:15   01:00:04:15
FCM: NON-DROP FRAME
008 BL     V   W113 015    00:00:00:00   00:00:00:15   01:00:04:15   01:00:05:00
```

EDL TITLE: TAHITI
TOTAL TIME: 00:00:05:00

ELEMENT 1:

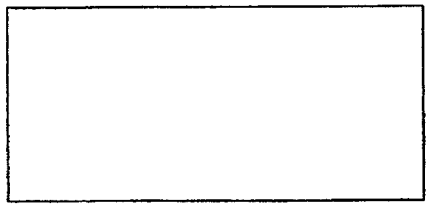

SOUND TRACK – 44.1 KHz
001      A    C
TAHITI   06:03:18:27:  06:03:23:27
RECORD 01:00:00:00  01:00:05:00

ELEMENT 2:

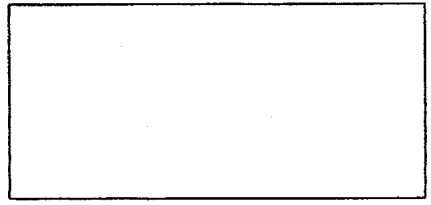

FADE IN TO AIRPLANE SHOT
002      V    D    015
BLACK    00:00:00:00  00:00:00:15
TAHITI   06:46:56:25  06:46:57:25
RECORD 01:00:00:00  01:00:01:00

ELEMENT 3:

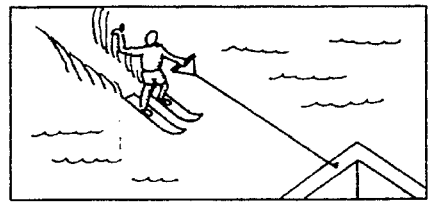

WATERSKIING SHOT
003      V    C
TAHITI.  06:46:25:03  06:42:26:03
RECORD 01:00:01:00  01:00:02:00

ELEMENT 4:

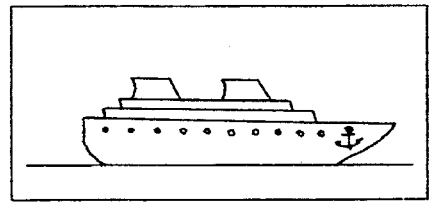

FREEZE FRAME OF SHIP
004      V    C
TAHITI   06:41:55:00  06:41:55:15
RECORD 01:00:02:00  01:00:02:15
SPEED   000.0

ELEMENT 5:

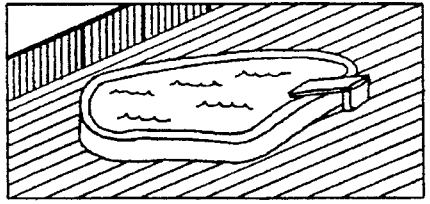

POOL AREA OF SHIP
005      V    C
TAHITI   06:42:29:00  06:42:29:15
RECORD 01:00:02:15:  01:00:03:00

ELEMENT 6:

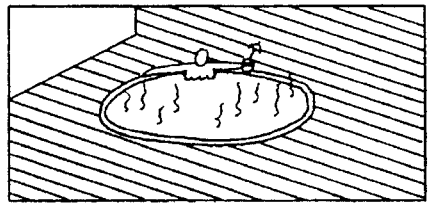

CREATURE COMFORTS IN HOT TUB
006      V    C
TAHITI   06:42:12:04  06:42:13:05
RECORD 01:00:03:00  01:00:04:01

ELEMENT 7:

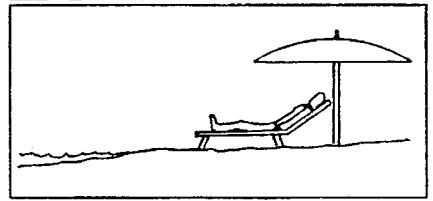

LYING ON THE BEACH
007      V    C
TAHITI   06:03:18:27  06:03:19:11
RECORD 01:00:04:01  01:00:04:15

ELEMENT 8:

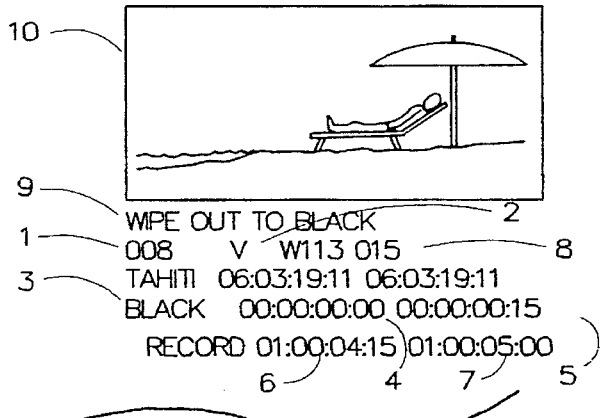

WIPE OUT TO BLACK
008      V    W113  015
TAHITI   06:03:19:11  06:03:19:11
BLACK    00:00:00:00  00:00:00:15
RECORD 01:00:04:15  01:00:05:00

FIG. 3

METHOD FOR VISUALLY AND AUDIBLY REPRESENTING COMPUTER INSTRUCTIONS FOR EDITING

This application is a continuation of application Ser. No. 08/045,978, filed Apr. 9, 1993, now abandoned, which is a continuing application of prior application Ser. No. 07/867,125, filed Apr. 10, 1992 now abandoned.

CROSS-REFERENCE TO RELATED APPLICATIONS

This application claims the benefit under 35 U.S.C. §120 of previously-filed, co-pending application Ser. No. 07/867,125, filed Apr. 10, 1992 and entitled "Method for Providing Visual Information with Instructions for Editing a Video Tape or Film Program," which is expressly incorporated by reference.

FIELD OF THE INVENTION

The invention belongs to the field of video and film editing. More particularly, the invention is related to methods for enabling a human user to understand computer instructions for editing video.

BACKGROUND OF THE INVENTION

Completed video and film programs are generally composed of segments from several sources. The programs are typically assembled by an editor who views the sources of material that are available and chooses the segments that will make up the final program. However, the program is not usually edited at the same place or time as the physical production of the final video tape or film; instead, the final production occurs at a facility equipped to produce the high-quality editing that is required for the final product. Therefore, the original editor of the program must generate a set of editing instructions to be used in the construction of the final program which is commonly automated using computer technology.

A set of editing instructions for video or film programs is often produced in a format called an edit decision list (EDL). A conventional EDL consists of a sequence of editing instructions, each of which is a computer instruction for a computerized edit controller which assembles a final program from source material. An editing instruction represents an event description, where each event is a transition to a new program segment. There are a number of available EDL formats (CMX, GVG, Sony, etc.), but each conveys similar information. The event description contains such information as the source of the new program segment, the time codes describing both the portion of the source that will be recorded and its destination in the final program, and the type of edited transition that is to be used from the previous segment. Using the information represented by editing instructions, the final program can be automatically constructed from the several sources of program material.

However, there are several problems with using conventional EDL's for video editing. Although EDL formats were created in a form which allowed them to be read by people, they are not in a form that is readily understood, as they are intended primarily to be computer instructions. A conventional EDL contains only alphanumerical information describing the video or film program transitions. This information is usually sufficient to produce the program. However, it is impossible from a conventional EDL to visualize the final program or its sources. For example, if an EDL requires modification, the original source material must be examined to determine the effects of any modification. This problem could arise, for instance, if an EDL was created to produce a sixty-minute program, but the appropriate program length was subsequently determined to be fifty-five minutes, thus requiring material to be cut. If the original editor (i.e., the person who produced the EDL) is unavailable or does not remember the exact nature of the segments of the program, it is impossible to determine from the EDL alone which portions of the program should be cut.

Furthermore, because the video or film program represented by the EDL cannot be readily visualized, in order to view the final program it must be actually constructed from the EDL. For example, if the final program is a television commercial, it is common to have it approved by the advertiser. Because the program represented by the EDL cannot be readily visualized, the final video tape or film must be sent to the advertiser for prior approval, which is an expensive and time-consuming process.

SUMMARY OF THE INVENTION

The invention disclosed herein is a method for visually and audibly representing computer instructions for editing video which provides audio and/or visual information along with editing instructions for a video tape or film program. The method involves, first, choosing the segments of video tape or film material to be incorporated into a video tape or film program, and then storing identifications of the sources of those segments of the program. Then, audio and/or visual information representative of each segment is stored so as to be associated with its corresponding identification of the source of the segment.

In one embodiment of the invention, the identification of the source of each segment includes an indication of the source tape or film of the segment and time codes indicating the points at which the segment begins and ends. The segment source identification can also indicate the type of transition (wipe, dissolve, etc.) that is to be used from the previous segment.

In a preferred embodiment of the invention, both the identifications of the segment sources and the visual representations are stored in computer-accessible forms, and the segment source identification includes a computer-readable pointer to the audio and/or visual representations for that segment. The visual representation is a sequence of images, and both the audio and visual representations can be in a digitized form. In a preferred embodiment, the invention provides a signal whereby an operator can request playback of the sequence of images and sound for any source segment. Ideally, both the segment source identifications and the digitized image and sound sequences are stored in the same computer file.

One possible means of implementing the storing and playback of the image sequences for the invention is to use QuickTime and WildMagic on the Apple Macintosh computer. QuickTime provides a means of playing back the sequence of images, and WildMagic allows the image sequence to be stored in a text file.

BRIEF DESCRIPTION OF THE DRAWING

In the drawing,

FIG. 3 is a representation of a visual edit decision list with a digitized image sequence (shown in the figure as a still picture) associated with each element.

DETAILED DESCRIPTION

Figure 1:
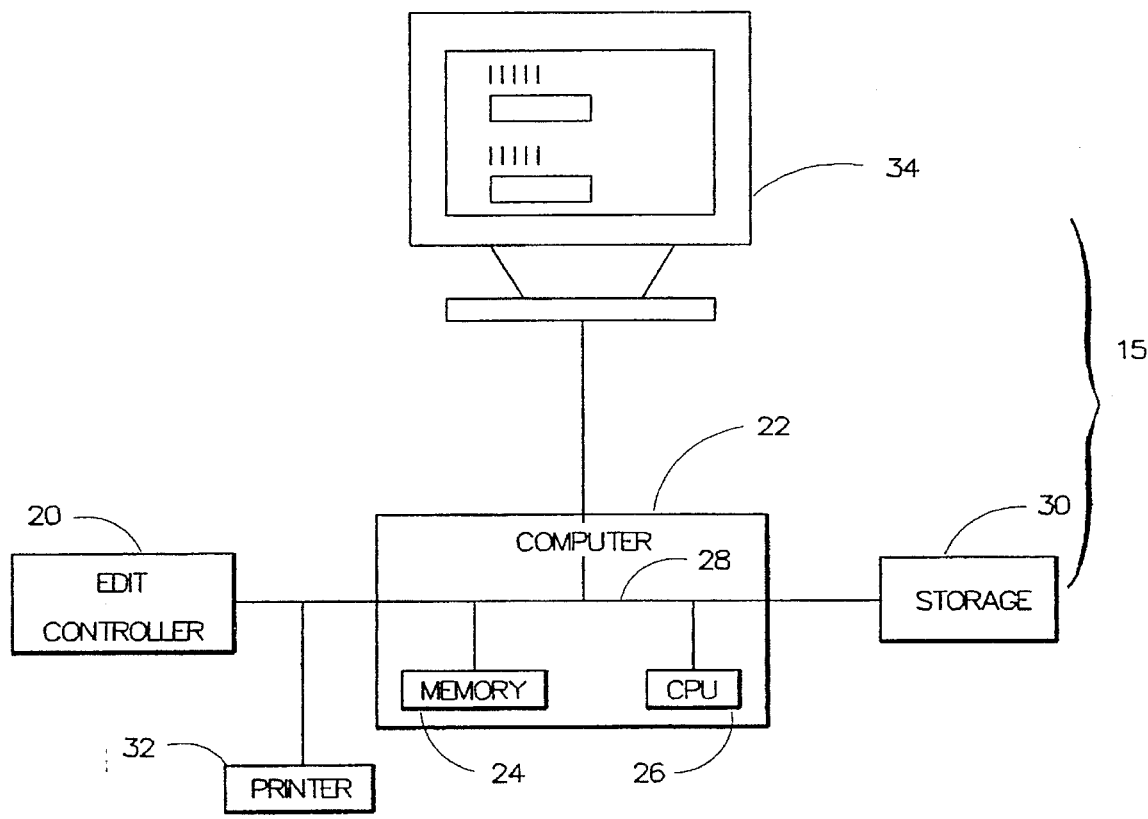
FIG. 1 is a block diagram of a computer system suitable for use with the present invention.

A conventional edit decision list (EDL) is a series of computer instructions for an edit controller 20 (FIG. 1) which produces an edited video or film program from several sources. The EDL is a list of editing instructions, each of which represents one segment of the program. Each editing instruction indicates the source of that segment (e.g., by the name of the video tape or film on which it is recorded) and the portion of the source, indicated by start and stop times, that makes up the segment. Edit decision lists are commonly generated using a computerized editing system 15 such as shown in FIG. 1. Such a system 15 commonly includes a computer 22 with a volatile, typically random-access, memory 24 connected to a central processing unit (CPU) 26 via a bus 28. Conventional computer systems, as well as those specially designed for video editing, may be used as the system 15 for the purpose of editing. More conventional computer systems may also include a printer 32 and non-volatile memory or storage 30, such as a hard disk or optical disk. The computer system 15 may be connected to an edit controller 20 to provide it with an EDL from which a video program may be created. The computer system 15 may also include a video display 34.

Figure 2:
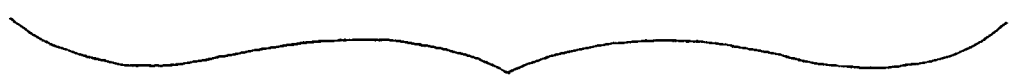
FIG. 2 is a conventional edit decision list.

FIG. 2 shows a typical EDL as it could appear on a computer display or as printed. This EDL is in CMX 340 format. (It should be noted that the particular EDL format used is not important for the invention, which is applicable to edit instructions generally.) This particular EDL is composed of eight editing instructions, each labeled by reference numeral 1. In this particular EDL, track type labels 2 indicate that one of the instructions describes the audio (A) portion of the program and the other seven instructions describe the segments of the video (V) portion. Each instruction, whether audio or video, indicates the origin of that segment by source label 3 and by source start time 4 and source stop time 5 of the segment. Similarly, destination start time 6 and destination stop time 7 indicate where that segment is to be recorded on the final program. Finally, transition type label 8 describes the type of transition (wipe, dissolve, etc.) that is to be used in moving to the segment described in the current editing instruction from the previous program segment.

To take a particular example of the EDL format, consider Element 3. Since track type label 2 for this element is "V", this element is a video segment. It is found on the tape or film labelled 1100511 from time code 06:46:25:03 to time code 06:46:26:03. Therefore, it is one minute long, and it is to be recorded from time code 01:00:01:00 to time code 01:00:02:00 on the "RECORD" tape or film. The edit transition from the previous segment to this one on the final tape is to be a cut, indicated by a "C" in transition-type label 8.

In the invention, the conventional EDL format is retained, but visual information is added. In the preferred embodiment of the invention, digital image sequences are added to the conventional EDL in a computer data file. FIG. 3 shows the same EDL as in FIG. 2 with the visual information added. Again, this is how the EDL would appear on a computer screen or display 34 or as printed via printer 20, though it should be noted that the images in the figure are very coarse and images on a computer screen are typically clearer. The visual EDL contains, as can be seen in FIG. 3, all of the alphanumerical information in the conventional EDL, with the addition of a comment field 9, which can be used as shown in the figure to label the segment. Most importantly, though, it can also be seen in FIG. 3 that for each editing instruction in the EDL there is an image 10. In FIG. 3, where only a still image can be displayed, each element is shown with the starting image of that segment (in elements 1 and 2, the image is black because the program begins by dissolving from black).

A sequence of images and sound that can be played back at the operator's request is preferably provided. This is possible in the embodiment of the invention in which the EDL is stored and read on a computer. Digitized image and sound sequences can be stored in computer files from which they can be played over the computer display 34 (FIG. 1) and audio speakers. In the preferred embodiment of the invention, each instruction in the EDL points to digitized sequences of video images and sound for that segment. The operator reading the EDL can then play back the visual and audio portions of any segment. (Again, this capability is available only when the operator is using the EDL on the computer. When the EDL is printed to paper, only a still image is available.)

The visual and audio sequences may be implemented in any of several ways. In general, the only requirements are for the ability to store the audio and visual sequences and to be able to reference those sequences from a file that contains the EDL text. A variety of general- and special-purpose computers can provide these capabilities. For example, Avid Technology, Inc., Burlington, Mass., has a software-based digital picture and sound compression system that can be used to generate and store such sequences. Apple Computer Co., Cupertino, Calif., also markets two products that can be used for this purpose, QuickTime and WildMagic for Apple Macintosh computers. QuickTime provides the Macintosh system with the capability to play a sequence of images stored in the computer memory on the display, and WildMagic allows a movie file, or, more precisely, a pointer to a movie file, to be placed in a Macintosh text file. (Use of these products is well-known in the art.) Hence, using these two products, a digital movie file (created, for example, while editing the material and create the EDL) can be placed in the EDL text file. Normally, although the text file will contain a reference to the entire movie, only a single image will be visible on the screen. However, using the capability of QuickTime, the operator can click on that image (i.e., use the Macintosh mouse to point to the image, and then press the mouse button to indicate that location to the Macintosh) to play the movie while remaining in the EDL computer to see the digitized movie of any segment of the EDL.

In another embodiment of the invention, the visual EDL document has three main sections: Header, Timeline, and Events List.

The Header section contains information which describes the program as a whole. It may contain the program's title, the name of the application which created the list, format version number, and creation date. In addition to standard information always present in the header section, the user may add supplemental information such as a short summary. Various kinds of formatting and control data may also be present, such as the text font to be used or point size. The following is one example of a possible header section:

Avid Visual EDL Format ©1992, Avid Technology, Inc.
    Generated by an Avid Media Composer, Version 5.0

VEDL Format: 1.0 Title: A Tahiti Travelog Creation Date: Feb. 20, 1992

Figure 4:
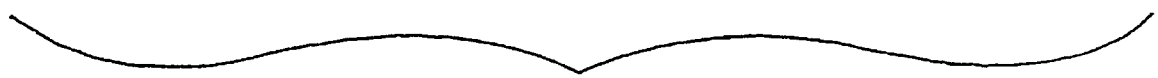
FIG. 4 is a graphical representation of a timeline representing a visual edit decision list.

The timeline section is a graphical depiction of the video program as a whole, such as shown in FIG. 4. Records tracks 40 (Video, Audio, Graphics, etc.) are arranged vertically, and program time is laid out horizontally. Time is represented by hour-minute-second-frame timecodes 42. Edits and transition effects are represented graphically with the use of icons 44 and other symbols. One possible representation, as a timeline, of part of the program, created by the EDL of FIGS. 2 or 3, is shown in FIG. 4. The generation of a timeline can be done using common computer graphic programming techniques.

Following the timeline is the edit decision list. In a conventional EDL, each event would be represented by one or two lines of specially formatted number and letter sequences which indicate the channels present, source identifier, the event type, source and record timecodes. In this embodiment, the conventional EDL format is retained and augmented with a digital movie clip which illustrates each event with moving pictures and sound. Four typical events are shown here.

Another aspect of the invention is a "Viewer" application for viewing a visual EDL in accordance with the invention. The Viewer allows EDL documents to be displayed on a color or monochrome computer screen. Paging, scrolling, goto events, and other functions which may be provided using common techniques allow various sections of the document to be displayed. Event clips can be activated and played to illustrate the event's content. A system capable of performing such functions is described above. In addition to displaying visual EDL documents, the Viewer application may also: extract information to file using conventional EDL formats; print using conventional EDL formats; print a graphical representation; transmit EDL information; and receive EDL information Extraction of conventional EDL data and its presentation in traditional file and print forms allows the visual EDL document continues to serve as an interchange format to other editing systems. Given a standard format for a visual EDL, common computer programming techniques can be used to generate a program to extract the conventional EDL information. This portability is highly useful, since the primary purpose of any EDL is to allow a video program to be assembled by an edit controller.

The visual EDL format is a completely new EDL format. As such, it is not currently supported by any other vendor of editing equipment, nor is it likely to be in the near future. A much closer level of cooperation among vendors is needed to handle video material than is need for text or sound. For this reason, by providing a function to extract EDL information and re-format it into one of several traditional EDL formats (CMX, GVG, Sony, etc.), the visual EDL document continues to serve as an interchange document. Extracted EDL files are machine-ready for loading into a target on-line system for creating a final video program.

The complement to extracting a traditional EDL file is printing in a traditional format. Printed files are quite useful during an on-line session for making notes, checking off edits assembled, etc. Most on-line editors are used to dealing with EDL information in one of these formats.

If a computer running the visual EDL Viewer application is physically near the on-line system (such as on a portable computer on the console, for example), the ability to format an EDL for the target system and transmit it serially to the system could be provided using well-known techniques. This capability is already provided by several EDL utilities and greatly enhances the effective use of VEDL documents.

In addition to a traditional EDL printout, the visual EDL document may be printed in a graphical form as well. This printout would include the timeline diagram, head frames of each video clip and any other visual information contained in the document. Naturally, sound and motion information cannot yet be reproduced on paper. Printing of such visual EDLs can be performed using the computer system described above.

Finally, the Viewer may allow new EDL data to be received from an on-line system and stored in a VEDL document. Blank clips are included as movie place holders for each edit instruction. A graphical timeline diagram is created and included using common graphic techniques and common processing steps, as found in conventional edit controllers, to construct a timeline. This allows capture of EDL information from the on-line system so it can be transported back to a system capable of adding video clips, etc.

There are several uses for visually represented EDLs. First, if modifications must be made to the EDL to produce the final program, the invention simplifies the process by allowing an editor to visualize the program from the edit decision list. For example, if a final program is intended for a four-minute television news spot, and its EDL provides instructions for a four-minute program, and a late story must be added to the news, it may be necessary to reduce the length of the original program. The person who had originally created the EDL for that program might remember which portions of which segments should be cut. But if that person is not available or does not remember each segment exactly, the invention allows another person to quickly view each segment to determine which portions of each segment are most easily omitted. With conventional EDLs, such a change would require using the EDL instructions to actually run the source material prior to deciding what to cut, a much more time-consuming process.

Another example of the usefulness of the invention is in the creation of commercials. When an agency creates a proposed television commercial, it must generally be approved by the advertiser. The advertiser could not use a conventional EDL to view the commercial, so it would be necessary to produce a final version for approval. The visual EDL invention, in contrast, allows the advertiser to see the final result, albeit in a somewhat less high-quality format, without the expense of producing a final video program that may not be approved. Moreover, changes could be suggested from viewing the EDL, which would greatly improve the turnaround time between successive versions of the commercial. Finally, only when the visual EDL is approved will it be necessary to have the final video program produced.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A computer-implemented method for visually representing computer instructions for assembling a video program, comprising the steps of:

a. choosing, with the aid of a computer, segments of video material to be incorporated into the video program;

b. storing, on a computer-readable medium and in response to a choice made in the step of choosing, an identification of a source of each segment of the video program and a destination of the segment in the video program, wherein the source and the destination form a computer instruction for assembling the video program; and c. storing, on the computer-readable medium and in response to the choice made in the step of choosing and with the computer instruction of each segment, a computer-accessible representation of the segment, distinct from the segment and which includes at least one of audio and video information.

2. The method defined by claim 1, wherein the identification of the source of each segment includes an indication of source material for the segment and time codes indicating points at which the segment begins and ends in the source material.

3. The method defined by claim 2, wherein the identification of the source of each segment includes an indication of a type of transition to be used from any previous segment in the video program.

4. The method defined by claim 1, wherein the representation for a segment is a single still image.

5. The method defined by claim 4, wherein each image for a segment is in a digitized form.

6. The method defined by claim 5, wherein the identification of each segment source and the digitized representations are stored in a single computer file.

7. The method defined by claim 5, further comprising monitoring a signal whereby an operator can request playback of the representations of for any segment in the video program.

8. A computer-implemented method for visually representing computer instructions for assembling a video program, comprising the steps of:

a. choosing, with the aid of a computer, segments of video material to be incorporated into the video program;

b. storing on a computer-readable medium and in response to a choice made in the step of choosing, an identification of a source of each segment of the video program in a computer-accessible form and a destination of the segment in the video program, wherein the source and the destination form an instruction for assembling the video program;

c. storing, in response to a choice made in the step of choosing, a representation of each segment in a location on the computer-readable medium in a computer-accessible form, distinct from the segment which includes at least one of audio and video information; and d. storing, on the computer-readable medium and in response to a choice made in the step of choosing and with the identification of each segment source, a computer-readable identification of the location of the representation of that segment.

9. The method defined by claim 8, wherein the representation for a segment is a single still image.

10. The method defined by claim 9, wherein the image for a segment is in a digitized form.

11. The method defined by claim 10, wherein the segment source identifications and the digitized representations are stored in a single computer file.

12. The method defined by claim 10, further comprising monitoring a signal whereby an operator can request playback of the audio and video representations for any segment.

13. The method defined by claim 8, wherein the identification of the source of each segment includes an indication of source material for the segment and time codes indicating points at which the segment begins and ends in the source material.

14. The method defined by claim 13, wherein the identification of source material of a segment includes an indication of a type of transition to be used from any immediately previous segment in the video program.

15. A method for visually representing computer instructions for assembling a video program, comprising the steps of:

a. generating and storing in a computer-readable memory, in response to computer-assisted editing instructions, a sequence of computer instructions for assembling the video program, each identifying a source video and a segment of the source video and a destination of the segment in the video program;

b. storing, in the memory and in response to the computer-assisted editing instructions, with each computer instruction, a visual representation of the segment of the source video identified by the computer instruction for assembling the video program distinct from the segment.

16. The method of claim 15 further comprising the step of generating and storing, with the sequence of assembly instructions, a graphical timeline representative of the video program.

17. The method defined by claim 15, wherein the identification of the source of each segment includes an indication of source material for the segment and time codes indicating points at which the segment begins and ends in the source material.

18. The method defined by claim 17, wherein the identification of the source of each segment includes an indication of a type of transition to be used from any immediately previous segment in the video program.

19. The method defined by claim 15, wherein the representation for a segment is a sequence of images.

20. The method defined by claim 19, wherein each image for a segment is in a digitized form.

21. The method defined by claim 20, wherein the segment source identifications and the digitized representations are stored in a single computer file.

22. The method defined by claim 20, further comprising monitoring a signal whereby an operator can request playback of the audio and video representations for any segment.

23. A system for manipulating visual representations of computer instructions for assembling a video program, the system comprising:

a. means for receiving computer instructions for assembling the video program, each identifying a source of video information and a destination for the video information in the video program, and a representation of the video information associated with each instruction;

b. means for displaying the computer instructions, including means for displaying, for each computer instruction, the representation of the associated video information;

c. means for accessing the source identified by a computer instruction and for displaying the video information;

d. means for receiving a verification that the source of video information corresponds to the representation of the associated video information displayed by the means for displaying; and e. means for assembling the video program according to the computer instruction after receipt of the verification.

24. The system of claim 23 further comprising means for extracting the computer instructions from the visual representation of the computer instructions and for providing the computer instructions to the means for assembling.

25. A method for visually representing computer instructions for assembling a video program, comprising the steps of:

choosing segments of video material to be incorporated into the video program;

selecting a destination in the video program for the chosen segment;

selecting a type of transition to be used between each pair of segments of the video program;

storing, in response to the steps of selecting, and on a computer-readable medium in computer readable form for each segment of the video program, indications of a source of the segment, an indication of a portion of the source that identifies the segment, the selected destination in the video program, and the type of transition to be used from any previous segment in the video program, wherein the indications stored form a computer instruction for assembling the video program; and storing, on the computer-readable medium in response to the steps of selecting and for each of the selected segments, a representation of the selected segment in computer readable form, distinct from the segment and with the computer instruction stored for the segment includes at least one of audio and video information.

26. The method defined by claim 25, wherein the identification of the source of each segment includes an indication of source material for the segment and time codes indicating points at which the segment begins and ends in the source material.

27. The method defined by claim 25, wherein the representation for a segment is a sequence of images.

28. The method defined by claim 27, wherein each image for a segment is in a digitized form.

29. The method defined by claim 28, wherein the segment source identifications and the digitized representations are stored in a single computer file.

30. The method defined by claim 28, further comprising the step of monitoring a signal whereby an operator can request playback of the representations for any segment.

31. A method for audibly representing computer instructions for assembling an audio program, comprising:

choosing, with the aid of a computer, segments of audio material to be incorporated into the audio program;

storing, in response to a choice made in the step of choosing, an identification of a source of each segment of the audio program;

storing with the identification of each segment source, in response to the choice made in the step of choosing, an indication of a location in the audio program selected for the segment; and storing with the identification of the source of each segment, in response to the choice made in the step of choosing, a representation of that segment, distinct from the segment and which includes audio information, wherein the representation for the segment is a digitization of the audio of the segment.

* * * * *